United States Patent [19]
Haupt

[11] Patent Number: 4,571,594
[45] Date of Patent: Feb. 18, 1986

[54] DIRECTIONAL ANTENNA SYSTEM HAVING SIDELOBE SUPPRESSION

[75] Inventor: Randy L. Haupt, Stow, Mass.

[73] Assignee: The United States of America as represented by the Secretary of the Air Force, Washington, D.C.

[21] Appl. No.: 529,078

[22] Filed: Sep. 2, 1983

[51] Int. Cl.[4] ........................ H01Q 19/12; G01S 3/16; G01S 3/28

[52] U.S. Cl. .................................... 343/840; 343/914; 343/915; 343/379

[58] Field of Search .................... 343/379, 18 R, 18 D, 343/18 B, 840, 914, 915

[56] References Cited

U.S. PATENT DOCUMENTS

| | | | |
|---|---|---|---|
| 3,142,837 | 7/1964 | Johnson | 343/18 D |
| 3,176,302 | 3/1965 | Tipton | 343/914 |
| 3,308,464 | 3/1967 | Lewis | 343/18 |
| 3,412,405 | 11/1968 | Crotty et al. | 343/777 |
| 3,471,860 | 10/1969 | Amburgey | 343/915 |
| 3,568,197 | 3/1971 | Cubley | 343/18 D |
| 3,715,749 | 2/1973 | Archer | 343/18 D X |
| 3,740,749 | 6/1973 | Marom | 343/100 LE |
| 3,742,513 | 6/1973 | Ehrenspeck | 343/915 X |
| 3,923,400 | 12/1975 | Hardy | 356/107 |
| 3,958,246 | 5/1976 | Wohlers et al. | 343/18 D X |
| 3,969,731 | 7/1976 | Jenkins et al. | 343/840 |
| 4,052,723 | 10/1977 | Miller | 343/379 |
| 4,065,748 | 12/1977 | Maguer et al. | 340/9 |
| 4,090,204 | 5/1978 | Farhat | 343/754 |
| 4,314,249 | 2/1982 | Onoe | 343/18 D |
| 4,376,940 | 3/1983 | Miedema | 343/840 |

FOREIGN PATENT DOCUMENTS

| | | | |
|---|---|---|---|
| 0107606 | 7/1982 | Japan | 343/379 |

OTHER PUBLICATIONS

J. H. Lang and D. H. Staelin, "Electrostatically Figured Reflecting Membrane Antennas for Satellites" IEEE Transactions on Automatic Control, vol. AC-27, No. 3, Jun. 1982.

*Primary Examiner*—Theodore M. Blum
*Assistant Examiner*—John B. Sotomayor
*Attorney, Agent, or Firm*—Donald J. Singer; Richard J. Donahue

[57] ABSTRACT

An electrostatically figured directional antenna array for deployment in outer space having means for suppressing sidelobe responses. A portion of the reflector surface symmetric about its center is vibrated by electrostatic controls to change the amplitude and phase of the sidelobe signals whereby the latter can be eliminated by passive filters or time averaging circuitry.

6 Claims, 11 Drawing Figures

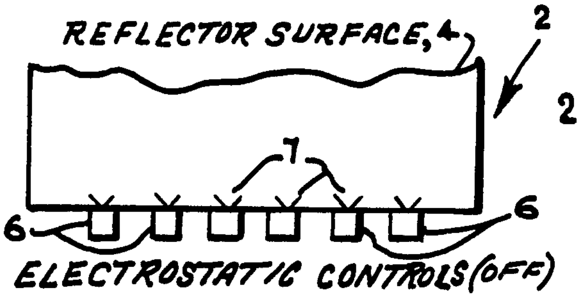
FIG.1A
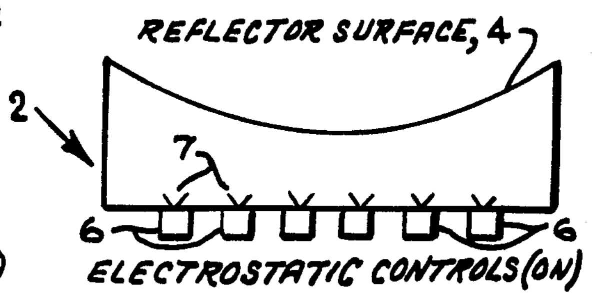
FIG.1B
FIG.2
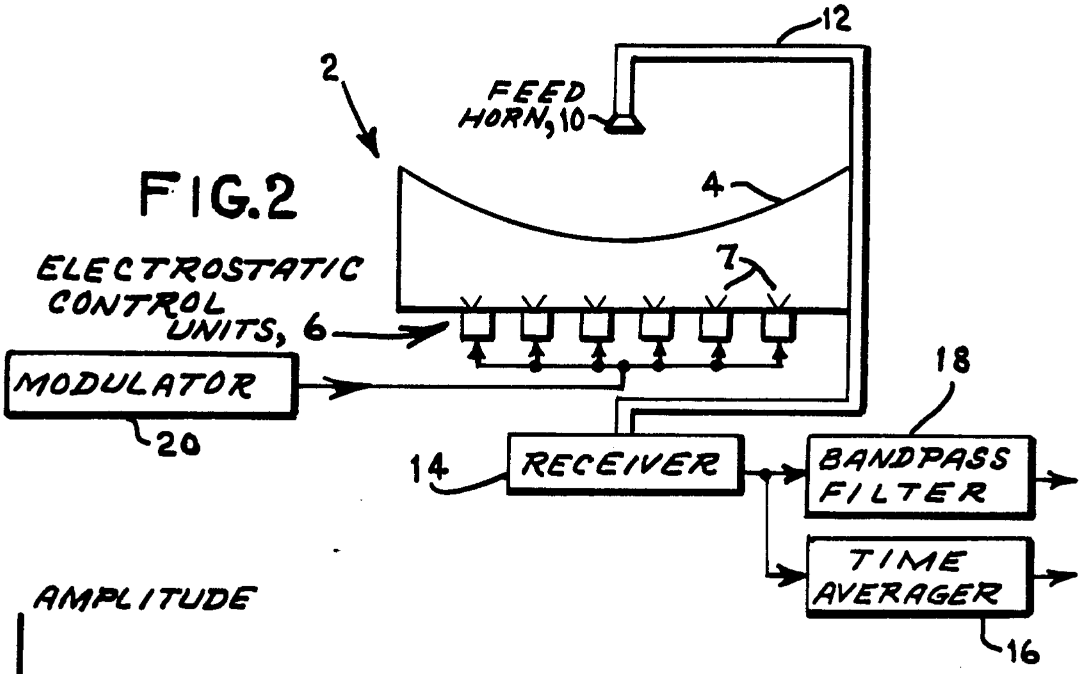
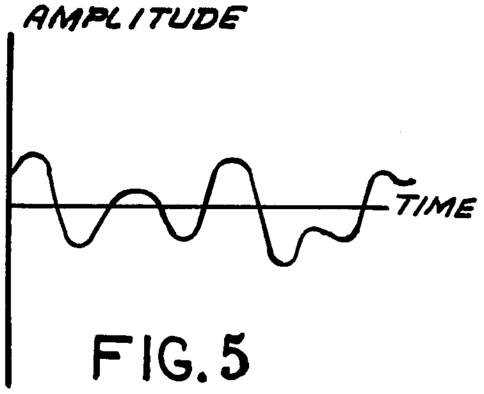
FIG.5
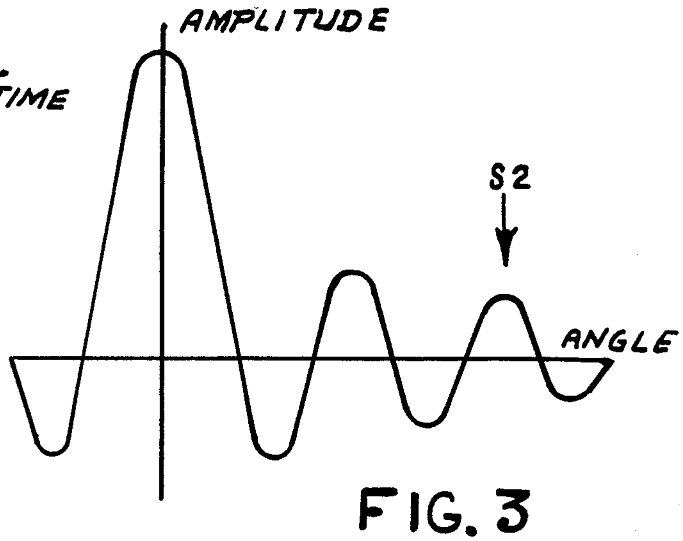
FIG.3

FIG. 4A
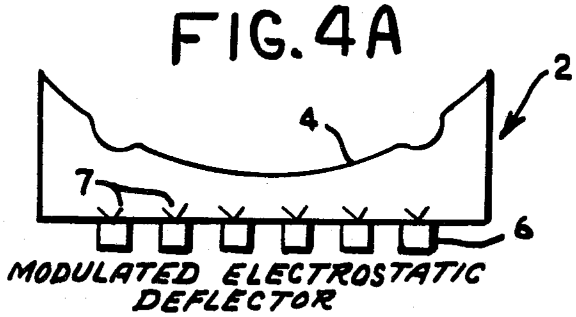
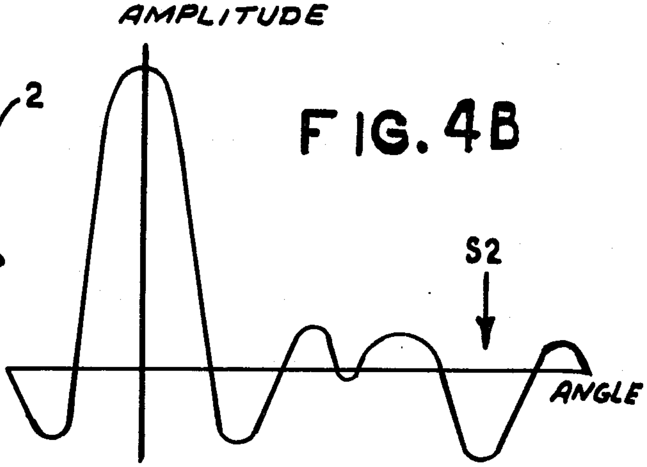
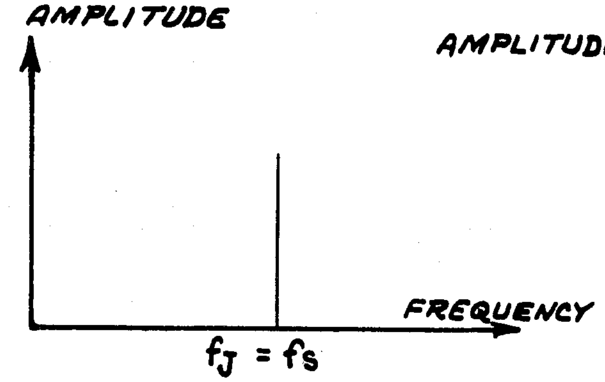
FIG. 6A
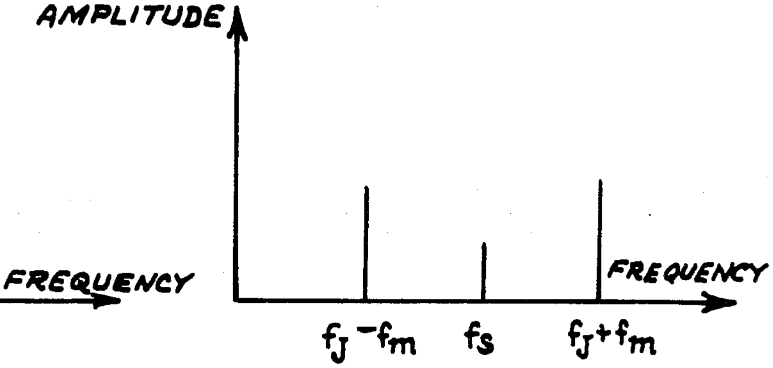
FIG. 6B
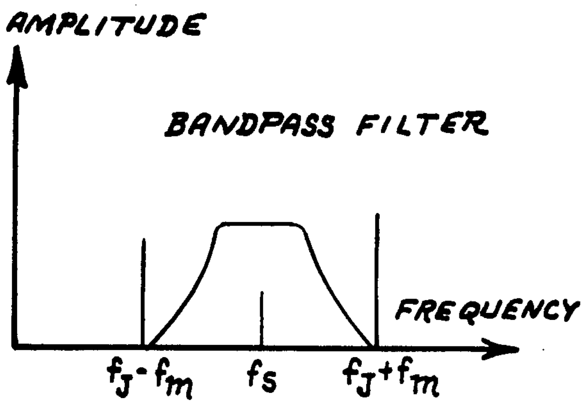
FIG. 7A
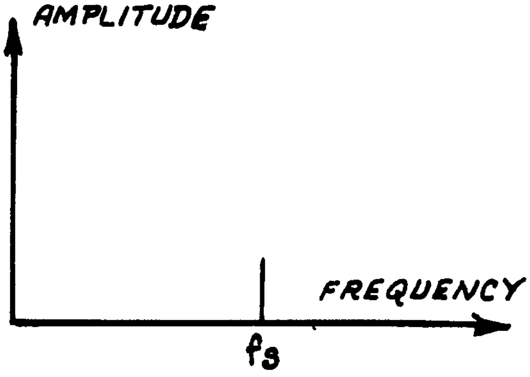
FIG. 7B

DIRECTIONAL ANTENNA SYSTEM HAVING SIDELOBE SUPPRESSION

STATEMENT OF GOVERNMENT INTEREST

The invention described herein may be manufactured and used by or for the Government for governmental purposes without the payment of any royalty thereon.

BACKGROUND OF THE INVENTION

The present invention concerns a directional antenna system for deployment in outer space having means for suppressing sidelobe interference.

Several papers have been presented in the past few years which disclose the design of a new class of directional antenna having a flexible metallic membrane reflector element. The flexible membrane is shaped by electrostatic forces applied to the back side of the membrane. One such paper concerning a very large, low mass, high precision, space deployable, reflecting antenna is entitled, "Electrostatically Figured Reflecting Membrane Antennas For Satellites", and appears on pp. 666–670 of the IEEE Transactions on Automatic Control, Vol. AC-27, No. 3, June 1982. The aforementioned antenna system however, like other directional antenna systems, has undesired sidelobe responses which permit signals received from radiant sources angularly displaced from the main axis of the reflector to interfere with and sometimes jam or mask the desired signals.

Various techniques have been used in the past to reduce sidelobe interference. Generally, sidelobe suppression in directional antennas is accomplished by combining the signal from the main antenna with that of an auxilliary antenna, suitably adjusted in amplitude and phase. Such systems, however, are generally expensive to fabricate requiring high precision components and complex electronic circuitry for adequate system bandwidth.

Another technique used to reject sidelobe interference is adaptive nulling. Using this technique, a null can be placed in a sidelobe to reduce the amount of energy received from the jamming source. Adaptive nulling, however, also requires costly components, as well as complicated algorithms and long processing times.

SUMMARY OF THE INVENTION

The deficiencies inherent in known antenna arrangements for suppressing sidelobes are avoided in the present invention which is specifically intended for use with electrostatically figured reflecting membrane antennas described above. The electrostatic transducers which are used to shape the reflector membrane to a parabolic shape, are also modulated whereby a portion of the reflector surface, symmetric about the center of the antenna, is vibrated at a selected frequency. The vibration causes the antenna's sidelobe structure to change at the frequency of vibration but does not affect the main beam and the desired signal. Any signal entering the sidelobe is constantly changing in amplitude and phase, while the signal entering the main beam is not. The received signal is thereafter time averaged by appropriate electronic circuitry whereby the sidelobe signals are eliminated. Alternatively, the received signal may be passed through a passive filter whereby the modulated jamming signals are eliminated.

BRIEF DESCRIPTION OF THE DRAWINGS

FIGS. 1A and 1B are simplified pictorial representations of the reflector element of the present invention;

FIG. 2 is a block diagram representation of the antenna system of the present invention;

FIG. 3 is a waveform of the unmodulated far field radiation pattern of the present invention;

FIG. 4A is a pictorial representation of the symmetrically modulated reflector element;

FIG. 4B is a waveform depicting the modulated far field radiation pattern of the present invention;

FIG. 5 is a waveform depicting the sidelobe signal response of the present invention; and FIGS. 6A, 6B, 7A and 7B are graphs depicting the signal amplitude versus frequency responses of the present invention.

DETAILED DESCRIPTION OF THE PREFERRED EMBODIMENT

Referring now to the drawings, FIGS. 1A and 1B illustrate an electrostatic reflector 2 having a flexible metallic membrane or reflective surface 4. This surface may be constructed of an elastic wire mesh or a metal coated plastic film. Affixed to the back surface of the reflector 2 are a plurality of electrostatic control elements 6, each of which generates a high voltage negative charge on its surface. An electron gun can be used to place the negative charges on the surface 7 of the control elements 6. By giving the reflector surface 4 a positive bias, an electric field is formed between the two surfaces. Since the reflector surface 4 is very pliable, it is attracted to the electrostatic controls. In effect, the reflector surface 4 and electrostatic controls 6 form a large capacitor. Varying the charge on an individual control unit 6 changes the field between it and the reflector surface positioned thereabove with a resultant change in the shape of the reflector 2. When the control units 6 are deactivated, as shown in FIG. 1A, the reflector surface assumes an irregular shape. When activated, as shown in FIG. 1B, however, the values of the charge produced by the individual control units 6 can be adjusted to provide a smooth parabolic surface.

FIG. 2B illustrates the various elements of the directional antenna system of the present invention. When used to receive a signal, the axis of the reflector 2 is pointed in the direction of the signal source. A feed horn 10 receives signals reflected by the reflector 2 and the signals are coupled via an appropriate waveguide or coaxial cable 12 to a receiver 14. The receiver 14 filters and down converts the signals to a lower frequency. Output signals from the receiver are then coupled to either a time averaging circuit 16 or a bandpass filter 18. From here the signals are passed through an A/D converter to a computer of conventional design. The electrostatic control units 6 are individually modulated by signals from modulator 20. The computer determines the modulation frequency.

The graph of FIG. 3 illustrates the far field radiation pattern of the antenna system of the present invention, when the reflector surface 4 has been shaped to a parabolic surface, as shown in FIG. 1B but is not vibrated by modulator 20.

FIG. 4A depicts the reflector 2 when modulator 20 is activated to generate forces of different amplitude at various ones of the electrostatic control elements 6. A typical resultant waveform of the far field pattern is presented in FIG. 4B. It will be noted that while the response of the system to the main signal received along the axis of the parabolic reflector remains the same, the response of the antenna to sidelobe signals is greatly altered. A signal entering the second sidelobe S2 in FIG. 3, will have a Q positive amplitude with time while the same signal in FIG. 4B will have a negative amplitude. By constantly modulating the sidelobes, the signals received through the sidelobes will have an amplitude with time similar to that shown in FIG. 5. It will be noted that the modulated signal in FIG. 5 has both positive and negative values. A similar drawing of the desired signal would show a constant amplitude signal over time. Hence the sidelobe signals may be greatly reduced by either band pass filtering of time averaging.

FIG. 6A is a graph illustrating the output signal when a sidelobe jamming signal $f_j$ is at the same frequency as the desired signal $f_s$. After modulation, however, as shown in FIG. 6B, the output signal consist of $f_s$, $f_j - f_m$ and $f_j + f_m$. Only the desired signal remains at the frequency $f_s$. The desired signal $f_s$ may be retained while rejecting the jamming signal by passing the signal through a narrow bandpass filter, such as the bandpass filter 18, having a passband response pattern as depicted in FIG. 7A, to produce the resultant output signal $f_s$.

As mentioned above, if certain electrostatic controls symmetrically placed about the center of the reflector are modulated at a frequency $f_m$, then the far field sidelobe structure of the antenna changes but the main beam retains its phase and gain. In the time domain, the composite output signal $S_t$ is given by the sum of the jamming signal $S_j$ and the desired signal $S_d$. Since the main beam does not vary in time, $S_d$ remains constant. On the other hand, the varying sidelobes cause the jamming sidelobe signal to change in phase and amplitude, as shown in FIG. 5. If these signals are averaged over time, then the desired signals add in phase, while the jamming signals tend to cancel each other. Therefore, only the desired signal remains after the signals pass through time averager 16. The time averaging may be done by a digital computer. If the received signal is digitized and passed on to the computer, it can store these values in memory, add them together, then divide by the number of samples. The result is the received signal averaged over time.

Although the invention has been described with reference to a particular embodiment, it will be understood to those skilled in the art that the invention is capable of a variety of alternative embodiments within the spirit and scope of the appended claims.

What is claimed is:

1. A directional antenna system comprising:

a reflector element having a flexible metallic membrane adapted for deployment in outer space, a feed horn positioned in front of said reflector element adapted to receive radiant energy reflected from said membrane, electrostatic control means positioned behind said metallic membrane adapted to provide electrostatic forces upon said membrane whereby said membrane is shaped to focus said radiant energy at said feed horn, signal processing means coupled to said feed horn for processing said radiant energy, and means for modulating said electrostatic control means to vibrate only discrete portions of said reflector element whereby the direction and shape of the main lobe of said reflector are unaffected while sidelobes of radiant energy are suppressed.

2. Apparatus as defined in claim 1 wherein said metallic membrane has a circular periphery.

3. Apparatus as defined in claim 2 wherein said electrostatic control means provide a quiescent parabolic shape of said flexible metallic membrane.

4. Apparatus as defined in claim 3 wherein said electrostatic control means comprise a plurality of individual high voltage generators concentrically position about the axis of said metallic membrane.

5. Apparatus as defined in claim 4 wherein said signal processing means comprises:

means for receiving said radiant energy from said feed horn, and bandpass filter means for passing the main beam signal while rejecting sidelobe signals.

6. Apparatus as defined in claim 4 wherein said signal processing means comprises:

means for receiving said radiant energy from said feed horn, and time averaging means coupled to said receiving means for averaging the received signals whereby sidelobe responses are cancelled.

* * * * *

UNITED STATES PATENT AND TRADEMARK OFFICE

CERTIFICATE OF CORRECTION

PATENT NO. : 4,571,594

DATED : 18 February 1986

INVENTOR(S) : Randy L. Haupt

It is certified that error appears in the above-identified patent and that said Letters Patent is hereby corrected as shown below:

In Column 3, line 5, the letter "Q" should be deleted.

Signed and Sealed this

*Eighth* Day of *July 1986*

[SEAL]

*Attest:*

DONALD J. QUIGG

*Attesting Officer* *Commissioner of Patents and Trademarks*